United States Patent
Gémesi

(10) Patent No.: US 11,926,376 B2
(45) Date of Patent: Mar. 12, 2024

(54) RUN-TIME STABILITY MONITORING OF A STEERING ANGLE SENSOR BASED ON NONIUS PRINCIPLE

(71) Applicants: thyssenkrupp Presta AG, Eschen (LI); thyssenkrupp AG, Essen (DE)

(72) Inventor: Roland Gémesi, Dunakeszi (HU)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 889 days.

(21) Appl. No.: 16/964,760

(22) PCT Filed: Feb. 2, 2018

(86) PCT No.: PCT/EP2018/052668
§ 371 (c)(1),
(2) Date: Jul. 24, 2020

(87) PCT Pub. No.: WO2019/149369
PCT Pub. Date: Aug. 8, 2019

(65) Prior Publication Data
US 2020/0361528 A1    Nov. 19, 2020

(51) Int. Cl.
*B62D 5/00* (2006.01)
*B62D 3/12* (2006.01)
(Continued)

(52) U.S. Cl.
CPC ............. *B62D 5/0481* (2013.01); *B62D 3/12* (2013.01); *B62D 5/0409* (2013.01); *B62D 1/16* (2013.01)

(58) Field of Classification Search
CPC ...... B62D 5/0481; B62D 3/12; B62D 5/0409; B62D 1/16; B62D 5/049
See application file for complete search history.

(56) References Cited

U.S. PATENT DOCUMENTS 5,930,905 A    8/1999    Zabler
6,212,783 B1*  4/2001    Ott ..................... G01B 7/24
                                                      33/1
(Continued)

FOREIGN PATENT DOCUMENTS

CN    101607571 A  * 12/2009    ............... B62D 5/04
CN    102681371 A    9/2012
(Continued)

OTHER PUBLICATIONS

Würges, M. (2013). New Electrical Power Steering Systems. In Encyclopedia of Automotive Engineering (eds D. Crolla, D.E. Foster, T. Kobayashi and N. Vaughan). https://doi.org/10.1002/9781118354179.auto008 (Year: 2013).*
English Translation of International Search Report issued in PCT/EP2018/052668, dated Oct. 24, 2018.

*Primary Examiner* — Elaine Gort
*Assistant Examiner* — Brittany Renee Peko
(74) *Attorney, Agent, or Firm* — hyssenkrupp North America, LLC

(57) ABSTRACT

A method for determining a risk of instability of a calculation of an angle φ of a steering shaft of a motor vehicle can be employed where a first gear wheel is fixed to the steering shaft and cooperates with a second gear wheel and a third gear wheel, which are smaller than the first gear wheel. The number of teeth of the first gear wheel is n. The number of teeth of the second gear wheel is m. And the number of teeth of the third gear wheel is m+1. The angles θ and ψ of the two smaller gear wheels are determined and the angular position φ of the steering shaft is calculated by evaluating the equation $$\phi = \frac{m*\psi + (m+1)*\theta - (2m+1)*k*\Omega}{2n},$$

(Continued)

with $\Omega$ being an angle of the sensor range and a whole number k given by $$k = \text{round}\left(\frac{(m+1)*\theta - m*\psi}{\Omega}\right),$$

wherein the risk of instability is determined by calculation of a stability margin t according to $$t = k - \left(\frac{(m+1)*\theta - m*\psi}{\Omega}\right).$$

13 Claims, 2 Drawing Sheets

(51) Int. Cl.
*B62D 5/04* (2006.01)
*B62D 1/16* (2006.01)

(56) References Cited

U.S. PATENT DOCUMENTS

| | | | |
|---|---|---|---|
| 10,259,489 B2* | 4/2019 | Minamiguchi | B62D 5/0463 |
| 2005/0171667 A1* | 8/2005 | Morita | B62D 5/04 |
| | | | 701/43 |
| 2005/0171727 A1* | 8/2005 | Sakabe | G01C 9/00 |
| | | | 702/151 |
| 2006/0015227 A1* | 1/2006 | Knoll | B62D 5/04 |
| | | | 701/41 |
| 2006/0116822 A1* | 6/2006 | Wenzler | G06F 19/00 |
| | | | 702/1 |
| 2007/0012506 A1* | 1/2007 | Asada | B62D 5/04 |
| | | | 180/446 |
| 2010/0235052 A1* | 9/2010 | Shartle | G06F 17/00 |
| | | | 701/41 |
| 2012/0231387 A1 | 9/2012 | Sugiura | |
| 2018/0127022 A1 | 5/2018 | Bakos | |
| 2020/0180689 A1* | 6/2020 | Asaka | B62D 6/10 |

FOREIGN PATENT DOCUMENTS

| | | |
|---|---|---|
| CN | 107580578 A | 1/2018 |
| DE | 19962241 A | 7/2001 |
| WO | 2012025703 A | 3/2012 |

* cited by examiner

RUN-TIME STABILITY MONITORING OF A STEERING ANGLE SENSOR BASED ON NONIUS PRINCIPLE

CROSS REFERENCE TO RELATED APPLICATIONS

This application is a U.S. National Stage Entry of International Patent Application Serial Number PCT/EP2018/052668, filed Feb. 2, 2018, the entire content of which is incorporated herein by reference.

FIELD

The present disclosure generally relates to steering mechanisms, including methods for determining risk of instability of a calculation of an angle of a steering shaft of a motor vehicle.

BACKGROUND

In an electromechanical power steering mechanism a steering shaft is connected to a steering wheel for operation by the driver. The steering shaft is coupled to a steering rack via a gear pinion. Steering rack rods are connected to the steering rack and to steered wheels of the motor vehicle. A rotation of the steering shaft causes an axial displacement of the steering rack by means of the gear pinion which is connected to the steering shaft in a torque-proof manner. Assist force is applied to a steering mechanism by driving an electric motor. In electromechanical power steering mechanism the multi-turn steering wheel angle sensor can consist of more than one gear wheel. A first gear wheel is mounted on the steering column having an outwardly directed first toothing, which represents the steering angle. One or two smaller gear wheels rotate on the toothing of the first gear. In case of using two smaller gears they have gear ratios higher than one and they differ by one or more teeth, so that one gear wheel turns faster than the other. In each of the two small gears a two-pole permanent magnet is arranged, providing magnetic signal for angle sensors. With this Nonius principle it is possible to determine an unambiguous steering angle over a defined range of turns of the steering wheel.

U.S. Pat. No. 5,930,905 discloses a sensor construction and calculation method for measurement of the angular position of the steering wheel in a vehicle with Nonius principle. A gear wheel which has n teeth is attached to the steering shaft. Two further gear wheels, which have m and m+1 teeth, are coupled, fixed in place, with the gear wheel. The sensor measures the angles of the two gear wheels with aid of two absolute angle sensors and calculates steering shaft angle by a software solution. The output of the calculation algorithm is well suppressing sub-gear angle errors, but when a critical sub-gear angle error limit is exceeded, the output of the calculation becomes instable.

Thus a need exists for a software solution that improves the monitoring of the stability of the output of the calculation.

DETAILED DESCRIPTION

Figure 1:
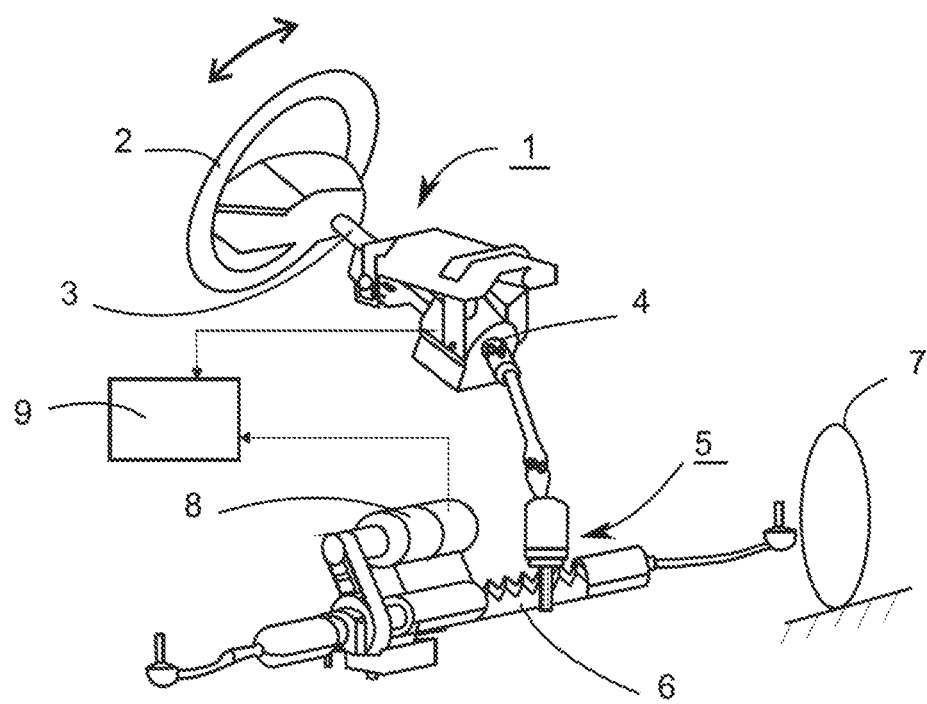
FIG. 1 is a schematic view of an example electromechanical power steering system of a motor vehicle with a multi-turn steering wheel angle sensor.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for determining a risk of instability of a calculation of an angle of a steering shaft of a motor vehicle. The present disclosure also generally relates to devices for detecting the angular position by way of the disclosed methods and to electromechanical power steering systems of motor vehicles with such devices.

Accordingly, a method for determining a risk of instability of a calculation of an angle $\phi$ of a steering shaft of a motor vehicle is provided, wherein a first gear wheel is fixed to the steering shaft, which cooperates with at least two further smaller gear wheels, wherein the number of teeth of the first gear wheel is n, that of a first smaller gear wheel is m, and that of a second smaller gear wheel is m+1, wherein the angles $\theta$ and $\psi$ of the two smaller gear wheels are determined and the angular position $\phi$ of the steering shaft is calculated by evaluating the equation $$\phi = \frac{m*\psi + (m+1)*\theta - (2m+1)*k*\Omega}{2n},$$

with $\Omega$ being the angle of the sensor range and the whole number k given by $$k = \text{round}\left(\frac{(m+1)*\theta - m*\psi}{\Omega}\right),$$

wherein the risk of instability is determined by calculation of a stability margin t according to $$t = k - \left(\frac{(m+1)*\theta - m*\psi}{\Omega}\right).$$

Monitoring the stability margin allows to detect various sensor errors so that instability can be avoided.

Preferably, a threshold thr for t is set according to $$\text{abs}\left[\text{fraction}\left(\frac{(m+1)*\theta - m*\psi}{\Omega}\right)\right] \geq thr,$$

wherein exceeding the threshold thr indicates an instable calculation of steering shaft angle ϕ. The threshold presents an easy way to decide if an instable situation is present or not. It is advantageous, if a warning occurs if the threshold is exceeded.

In a preferred embodiment the threshold thr is between 0.3 and 0.45, in particular equal to 0.4.

It is further advantageous to analyse the symmetry of t and if a asymmetry over a predefines threshold $thr_a$ is detected, fine-adjusting the angle measurement of the two smaller gear wheels by $$\Delta\theta = \frac{(\max(t) + \min(t))\Omega}{4(m+1)}$$

$$\Delta\psi = \frac{(\max(t) + \min(t))\Omega}{4m},$$

wherein the steering shaft angle ϕ is then calculated by:

$$\phi = \frac{m*(\psi + \Delta\psi) + (m+1)*(\theta + \Delta\theta) - (2m+1)*k*\Omega}{2n}.$$

In a preferred embodiment the threshold $thr_a$ is between 0.1 and 0.2, in particular equal to 0.15.

This way, errors in calculation can be fixed by re-calibration of the smaller gear wheel angle measurements. Preferably, the fine-adjusted values are saved in a non-volatile memory, so that the values can be read-out after system restart.

In a preferred embodiment in case of a missing sensor calibration of the smaller gear wheels, a self-calibration is carried out, wherein in a first step t is calculated based on the first sensor readings after system start-up and the smaller gear angle sensors are calibrated to have a common zero output, wherein the smaller gear angle offsets are calculated by $$\Delta\theta = -\frac{t\Omega}{2(m+1)}$$

$$\Delta\psi = \frac{t\Omega}{2m}$$

and applied as constants in the calculation of the angle of rotation ϕ.

It is advantageous if m=14 and n=44. Further Ω can be 360°.

A device for detecting the angular position by means of the previously described method is provided wherein the angles θ and ψ are detected by means of sensors, and the steering shaft angle ϕ is determined in an evaluating circuit. Preferably, the angles θ and ψ are detected by means of one sensor each.

Further an electric power steering apparatus for assisting steering of a motor vehicle by conferring a support torque generated by an electric motor to a steering mechanism, the electric power steering apparatus comprising: a steering column with an upper steering shaft and a lower steering shaft linked by a torsion bar and a device for detecting the angular position of the upper steering shaft as previously described. Preferably, the sensors which detect the angular positions of the first and second smaller gear wheels are GMR angle sensors, which scan magnets connected with the smaller gear wheels.

FIG. 1 is a schematic drawing of an electric power steering system 1. A steering wheel 2 is fixed to an upper steering shaft 3, the steering movement of the driver is transmitted via a torsion bar to a lower steering shaft 4. The lower steering shaft 4 is coupled to a rack 6 via a rack-and-pinion mechanism 5. Rotation of the upper and lower steering shaft 3, 4 accompanying a steering operation is converted into a reciprocating linear motion of the toothed rack 6 by the rack-and-pinion mechanism 5. The linear motion of the rack 6 changes the steering angle of the steered road wheels 7. To provide steering assistance, the electric motor 8 can be mounted to the side of the rack 6. The steering assistance is provided by transferring the assist torque from the motor 8 to the rack 6. A steering controller 9 receives signals representative of the vehicle state and the torque applied to the steering wheel by the vehicle operator and determines the target motor torque which is send to a motor controller.

Figure 2:
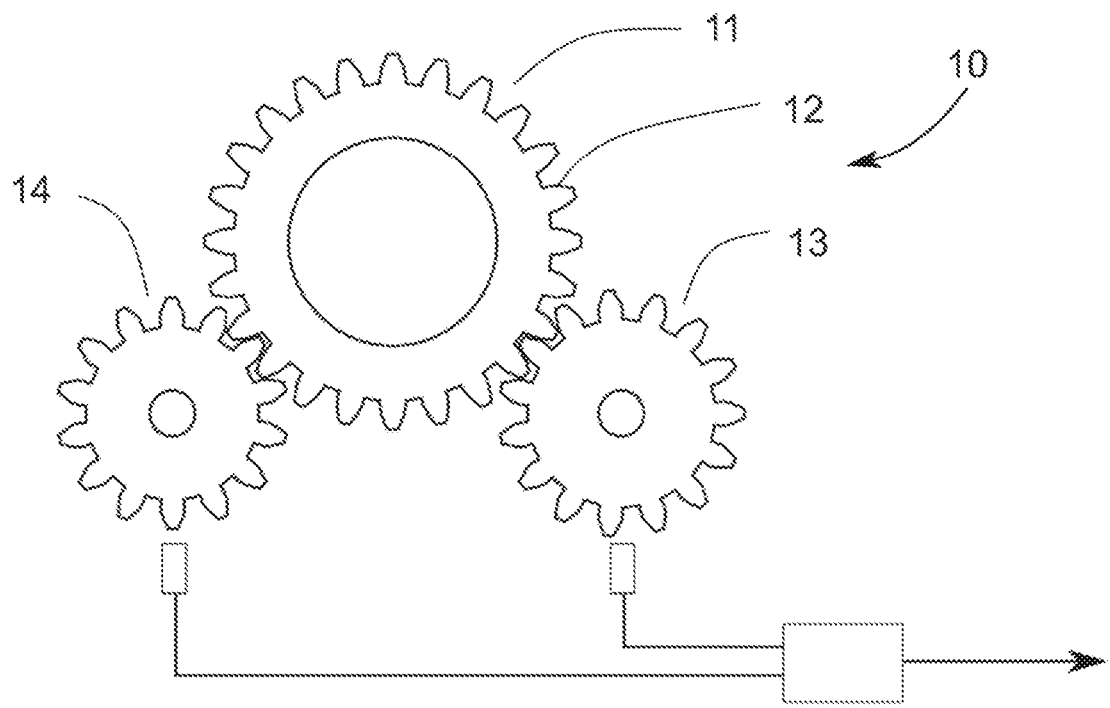
FIG. 2 is a schematic view of an example multi-turn steering wheel angle sensor with two sub-gears.

The electric power steering system 1 according to FIG. 1 is equipped with a multi-turn steering wheel angle sensor 10. The operation of the multi-turn steering wheel angle sensor 10 is explained in FIG. 2.

An angle sensor 10 comprises a first gear wheel 11 having an outwardly directed first toothing 12 with n teeth. The first gear 11 is fixed to the steering shaft. Two smaller gear wheels 13, 14 rotate on the toothing of the first gear 12. The sub-gear wheels 13, 14 rotate around gear wheel axis, wherein the gear wheel axis is parallel and shifted to the steering shaft axis. These smaller gears 13, 14 have gear ratios higher than one and they differ by one or more teeth, so that one gear wheel turns faster than the other. In the shown example the gear wheels 13, 14 have m and m+1 teeth. With this called nonius principle it is possible to determine an unambiguous steering angle ϕ over for example four full turns of the steering shaft or the steering wheel. In a preferred embodiment m=14 and n=44. The angles ψ and Θ of the two smaller gear wheels are measured with the aid of two periodic angle sensors. The periodicity of these angle sensors will be identified by Ω. Usually Ω is 360°, however, other angle values are also possible.

Figure 3:
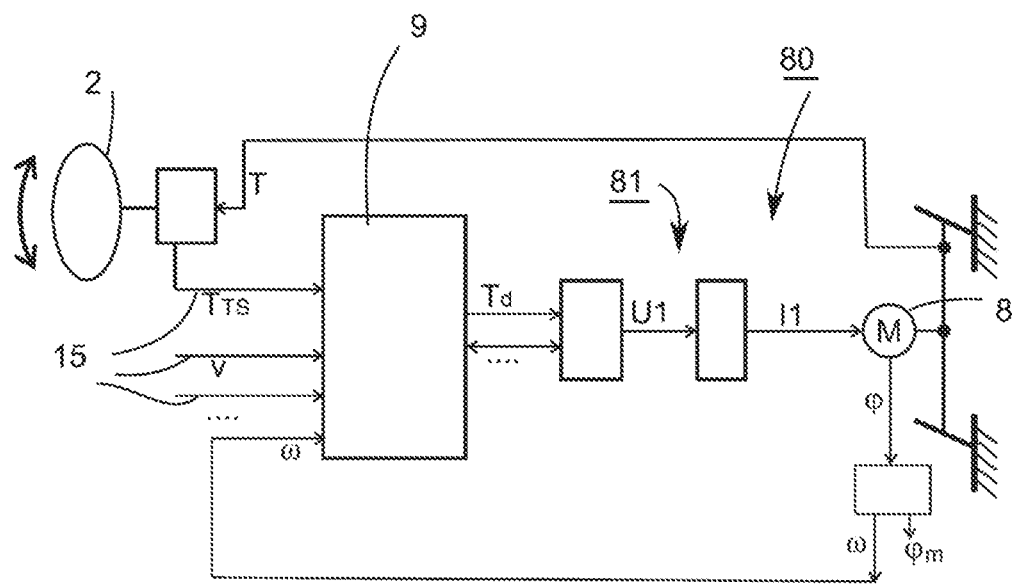
FIG. 3 is a schematic view of an example steering controller.

As shown in FIG. 3, electric power assist is provided through the steering controller 9 and a power assist actuator 80 comprising the electric motor 8 and a motor controller 81. The steering controller 9 in the example receives signals 15 representative of the vehicle velocity v and the torque $T_{TS}$ applied to the steering wheel 2 by the vehicle operator. In response to the vehicle velocity v, the operator torque $T_{TS}$ and the rotor position signal ω, the controller 9 determines the target motor torque $T_d$ and provides the signal through to the motor controller 81, where the motor currents I1 are calculated via PWM (pulse-width modulation).

The absolute steering wheel angle ϕ is calculated to influence the assist needed for the steering operation.

The calculation of the angle of rotation ϕ takes place in accordance with the method present in U.S. Pat. No. 5,930,905; In a first step, the expression $$k = \text{round}\left(\frac{(m+1)*\theta - m*\psi}{\Omega}\right)$$

is calculated, wherein the angles ψ and Θ had been previously measured. In step two, the angle φ is then calculated, wherein the following applies:

$$\phi = \frac{m*\psi + (m+1)*\theta - (2m+1)*k*\Omega}{2n}$$

A check is made in step three, whether the previously detected angle φ is negative. If this is the case, the full angle period is added in step four.

The software continuously monitors the calculated k-value. A stability margin t is defined as the rounded fractional part of k:

$$t = k - \left(\frac{(m+1)*\theta - m*\psi}{\Omega}\right),$$

with t in the range of (−0.5 . . . 0.5).

For every sensor reading, the stability margin t is calculated. The minimum and maximum of t over the sensor range Ω is calculated. An ideal error-free sensor has t=0.0 over the complete sensor range Ω. Output instability occurs when t is getting close to 0.5 and wrapping around −0.5 or vice versa. In case of inaccurate sensor calibration, t is getting asymmetric to 0.0, resulting in a sub-optimal stability margin.

The risk of instability is determined by setting a threshold e.g. 0.4:

$$\text{abs}\left[\text{fraction}\left(\frac{(m+1)*\theta - m*\psi}{\Omega}\right)\right] \geq 0.4$$

If this threshold is exceeded instability occurs and a warning occurs. The stability threshold is a piece-to-piece variable constant. The proposed threshold presents an easy way to monitor the stability of the steering wheel angle calculation. An increase of stability margin, pre-indicating various sensor errors can be detected so that instability can be avoided.

If steering is carried out over a steering range, being at least one sub-gear rotation, the symmetry of t is analysed. If asymmetry over a preset threshold is detected, fine-adjusting sensor calibration values are determined by:

$$\Delta\theta = -\frac{(\max(t) + \min(t))\Omega}{4(m+1)}$$

$$\Delta\psi = \frac{(\max(t) + \min(t))\Omega}{4m}$$

The angle φ is then calculated by:

$$\phi = \frac{m*(\psi+\Delta\psi) + (m+1)*(\theta+\Delta\theta) - (2m+1)*k*\Omega}{2n}$$

The fine-adjusted values are saved in a non-volatile memory so that they can be used on next system start-up. This way the sub-gear angles are run-time self-adjusted so that t is ideally symmetric and that the stability threshold is being maximized as much as possible.

Further in case of missing end-of-line sensor calibration, a self-calibration is carried out. In a first step t is calculated based on the first sensor readings after system start-up. The sub-gear angle sensors are calibrated to have a common zero output. The initial sub-gear angle offsets are calculated $$\Delta\theta = -\frac{t\Omega}{2(m+1)}$$

$$\Delta\psi = \frac{t\Omega}{2m}$$

and applied as constants in the calculation of the angle of rotation φ.

Figure 4:
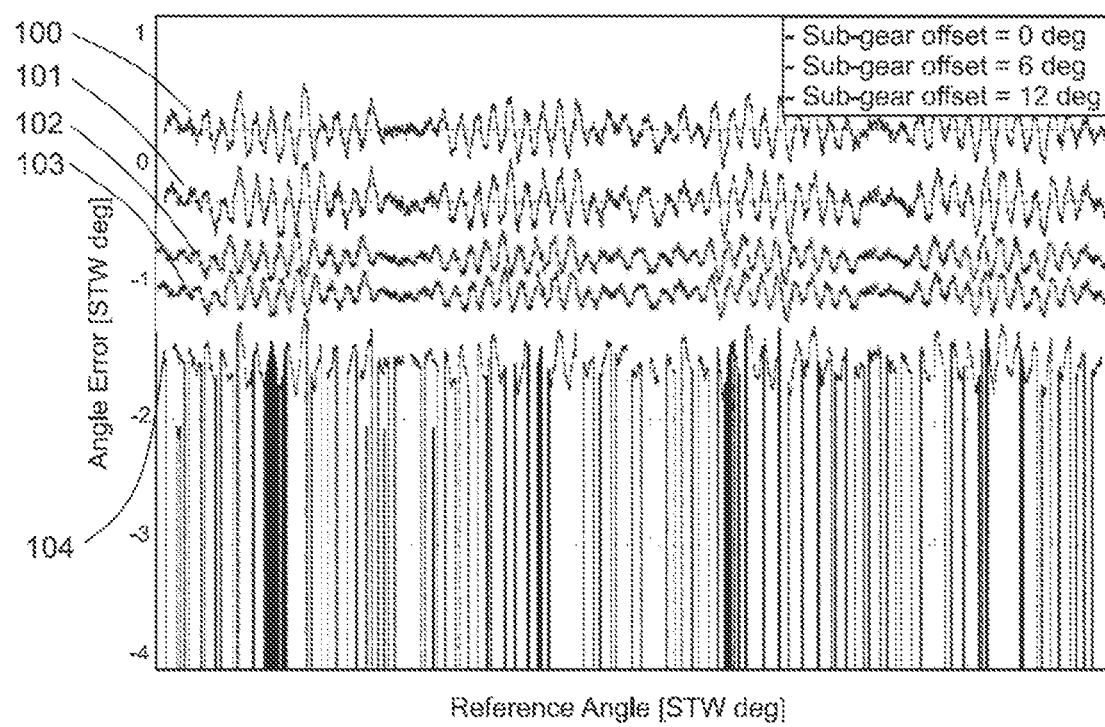
FIG. 4 is a graph of signals measured by a multi-turn steering wheel angle sensor.

FIG. 4 shows an example of measured sensor output instability. The angle error of the angle φ of the steering shaft is plotted against a reference angle. From top to bottom the first two lines 100, 101 represent the calculated angle errors over the sensor range with a 0° offset of a first sub-gear. The calculated angle errors are symmetric to 0.0. The following two lines 102, 103 represent the calculated angle errors over the sensor range with a 6° offset of the first sub-gear. The calculated angle errors are highly asymmetric with respect to 0.0. The bottom line 104 shows the calculated angle errors with an offset of 12° of the first sub-gear.

What is claimed is:

1. A method for determining a risk of instability of a calculation of an angle φ of a steering shaft of a motor vehicle, wherein a first gear wheel is fixed to the steering shaft and cooperates with at least a second gear wheel and a third gear wheel, wherein the second and third gear wheels are smaller than the first gear wheel, wherein a number of teeth of the first gear wheel is n, a number of teeth of the second gear wheel is m, and a number of teeth of the third gear wheel is m+1, the method comprising:

determining angles θ and ψ of the second and third gear wheels and the angle φ of the steering shaft according to an equation $$\phi = \frac{m*\psi + (m+1)*\theta - (2m+1)*k*\Omega}{2n},$$

with Ω being an angle of a sensor range and with a whole number k given by $$k = \text{round}\left(\frac{(m+1)*\theta - m*\psi}{\Omega}\right);$$

and
determining the risk of instability by calculating a stability margin t according to $$t = k - \left(\frac{(m+1)*\theta - m*\psi}{\Omega}\right).$$

and performing a self-calibration in the calculation of the angle φ of the steering shaft based on the stability margin t.

2. The method of claim 1 wherein a threshold thr for the stability margin t is set according to $$\text{abs}\left[\text{fraction}\left(\frac{(m+1)*\theta - m*\psi}{\Omega}\right)\right] \geq thr,$$

wherein exceeding the threshold thr indicates an instable calculation of the angle φ of the steering shaft.

3. The method of claim 2 wherein the threshold thr is between 0.3 and 0.45.

4. The method of claim 2 wherein the threshold thr is equal to 0.4.

5. The method of claim 1 comprising:
analyzing symmetry of the stability margin t; and
if an asymmetry that exceeds a preset threshold $thr_a$ is detected, fine-adjusting angle measuring the second and third gear wheels by $$\Delta\theta = -\frac{(\max(t) + \min(t))\Omega}{4(m+1)}$$

and $$\Delta\psi = \frac{(\max(t) + \min(t))\Omega}{4m}$$

wherein the angle φ of the steering shaft is calculated by $$\phi = \frac{m*(\psi + \Delta\psi) + (m+1)*(\theta + \Delta\theta) - (2m+1)*k*\Omega}{2n}.$$

6. The method of claim 5 comprising saving fine-adjusted values in a non-volatile memory so that the fine-adjusted values can be queried after a system restart.

7. The method of claim 1 wherein upon a missing sensor calibration of the second and third gear wheels, the method comprises:
in a first step of the self-calibration the stability margin t is calculated based on first sensor readings after system startup; and
calibrating gear angle sensors of the second and third gear wheels to have a common zero output, wherein angle offsets of the second and third gear wheels are calculated by $$\Delta\theta = -\frac{t\Omega}{2(m+1)} \text{ and } \Delta\psi = \frac{t\Omega}{2m}$$

and applied as constants in the calculation of the angle φ of the steering shaft.

8. The method of claim 1 wherein m=14 and n=44.

9. The method of claim 1 wherein the angle of a sensor range Ω=360°.

10. A device for detecting an angle φ of a steering shaft by way of the method of claim 1, the device comprising:
sensors for detecting the angles θ and ψ; and
an evaluating circuit for determining the angle φ of the steering shaft.

11. The device of claim 10 wherein the angles θ and ψ are detected by way of one sensor each.

12. An electric power steering apparatus for assisting steering of a motor vehicle by conferring a support torque generated by an electric motor to a steering mechanism, the electric power steering apparatus comprising:
a steering column with an upper steering shaft and a lower steering shaft linked by a torsion bar; and
a device according to claim 10 for detecting an angular position of the upper steering shaft.

13. The electric power steering apparatus of claim 12 wherein the sensors that detect the angles θ and ψ of the second and third gear wheels are GMR angle sensors that scan magnets connected to the second and third gear wheels.

* * * * *